US008232988B2

(12) United States Patent
Mathews et al.

(10) Patent No.: US 8,232,988 B2
(45) Date of Patent: Jul. 31, 2012

(54) PRE-COMPUTING IMAGE MANIPULATIONS

(75) Inventors: Brian Philip Mathews, San Rafael, CA (US); Benjamin David Cochran, Corte Madera, CA (US); Nitin Mohan, San Francisco, CA (US); Jeffrey Richard Klug, Lehi, UT (US); John Daniel Schmier, Petaluma, CA (US)

(73) Assignee: Autodesk, Inc., San Rafael, CA (US)

( * ) Notice: Subject to any disclaimer, the term of this patent is extended or adjusted under 35 U.S.C. 154(b) by 758 days.

(21) Appl. No.: 11/931,919

(22) Filed: Oct. 31, 2007

(65) Prior Publication Data

US 2009/0109217 A1    Apr. 30, 2009

(51) Int. Cl.
*G06T 15/00*    (2011.01)
(52) U.S. Cl. .................. 345/419; 345/420; 345/653
(58) Field of Classification Search .................. None
See application file for complete search history.

(56) References Cited

U.S. PATENT DOCUMENTS

| | | | |
|---|---|---|---|
| 5,724,492 A * | 3/1998 | Matthews et al. | 345/419 |
| 5,838,906 A | 11/1998 | Doyle et al. | |
| 5,999,641 A * | 12/1999 | Miller et al. | 382/154 |
| 7,003,134 B1 * | 2/2006 | Covell et al. | 382/103 |
| 7,185,069 B2 | 2/2007 | Costin et al. | |
| 2003/0097195 A1 * | 5/2003 | Yamrom et al. | 700/95 |

OTHER PUBLICATIONS

MapGuide Open Source 1.2—Developer's Guide, MapGuide Open Source, Autodesk, Inc. ,May 2007, 112 page.
OSGeo Your Open Source Compass—MapGuide Open Source, Project Home [retrieved on Feb. 18, 2008]. Retrieved from the internet at URL http://mapguide.osgeo.org, 5 pages.
OSGeo Your Open Source Compass—MapGuide Open Source, Features, etc. [retrieved on Feb. 18, 2008]. Retrieved from the internet at URL http://mapguide.osgeo.org/features.html, 3 pages.
Simin Baharlou, International Preliminary Report on Patentability in PCT/US200/058162, mailed May 14, 2010, 6 pages.
Chen et al. View Interpolation for Image Synthesis. ACE: International Conference on Computer Graphics and Interactive Techniques [online], pp. 179-288, 1993.
Oliveira et al. Image-Based Objects. University of North Carolina at Chapel Hill [online]. 1999 [retrieved on Jun. 31, 2008]. Retrieved from the Internet URL: http://ca.unc.edu/-pxfl/papers/ibo-paper.pdf>.
International Search Report and Written Opinion for PCT Application No. PCT/US2008/58182, dated Aug. 11, 2008.

* cited by examiner

*Primary Examiner* — Said Broome
(74) *Attorney, Agent, or Firm* — Fish & Richardson P.C.

(57) ABSTRACT

The present disclosure includes, among other things, systems, methods and program products for pre-computing image manipulations.

27 Claims, 7 Drawing Sheets

PRE-COMPUTING IMAGE MANIPULATIONS

BACKGROUND

If a user is viewing a three-dimensional (3D) computer aided design (CAD) model in a web browser, user manipulation of the model (such as rotation in the X, Y or Z direction) typically requires that one or more new images of the model be generated on a server and transmitted to the user's web browser for display. This results in latency since the user's browser must request a new image from the server, wait for the server to generate the image, and then receive the image from the server. This latency undermines real-time user interaction with the 3D model.

SUMMARY

In general, one or more aspects of the subject matter described in this specification can be embodied in one or more methods that include obtaining a plurality of distinct pre-computed images of a three-dimensional drawing where each of the plurality of images result from applying a constrained operation to the drawing to alter the appearance of the drawing where the operation is constrained to a single axis, a predetermined degree of application, or both. First input is accepted to apply the constrained operation to the drawing such that the drawing is in a first state. One of the pre-computed images whose appearance is closest to the drawing in the first state is selected. The selected image is caused to be displayed. Other embodiments of this aspect include corresponding systems, apparatus, and computer program products.

These and other embodiments can optionally include one or more of the following features. The constrained operation is one of: rotation about a single axis, scaling according to a predetermined scaling factor, or translation along a single axis. During accepting of the first input, displaying an animation that changes in response to the first input and provides a visual indication of how the drawing will appear based on the first input. The animation is of a cube. Selecting one of the pre-computed images and causing display of the pre-computed image occurs during the accepting. An additional plurality of pre-computed images of a three-dimensional drawing is obtained where the additional plurality of images result from applying the constrained operation to the drawing to alter the appearance of the drawing. The obtaining an additional plurality of pre-computed images does not include obtaining an image that is in the plurality of pre-computed images. The plurality of pre-computed images are obtained from a file. The selected image is displayed in a web browser.

In general, one or more aspects of the subject matter described in this specification can be embodied in one or more methods that include obtaining a plurality of distinct pre-computed images of a three-dimensional drawing where the plurality of images includes three sets of images, and where each image in a given set are of the drawing rotated a first number of degrees about a distinct axis for the given set. First input is accepted to rotate the drawing a second number of degrees about a first axis such that the drawing is in a first orientation and where the first input is constrained to be about the first axis. One of the pre-computed images for the first axis is selected that shows the drawing in an orientation that is closest to the first orientation. The selected image is caused to be displayed. Other embodiments of this aspect include corresponding systems, apparatus, and computer program products.

These and other embodiments can optionally include one or more of the following features. During accepting of the first input, displaying an animation that changes in response to the first input and provides a visual indication of how the drawing will be oriented based on the first input. The animation is of a cube. The first number of degrees is inclusively between one and thirty. The second number of degrees is inclusively between 1 and 360. Selecting one of the pre-computed images and causing display of the pre-computed image occurs during the accepting. An additional plurality of pre-computed images of a three-dimensional drawing are obtained where the additional plurality of images includes three sets of images, and where each image in a given set are of the drawing rotated a first number of degrees about a distinct axis for the given set based on the first orientation of the drawing. The obtaining an additional plurality of pre-computed images does not include obtaining an image in the plurality of pre-computed images. The plurality of pre-computed images are obtained from a file. The selected image is displayed in a web browser.

Particular implementations of the subject matter described in this specification can be implemented to realize one or more of the following advantages. A server pre-computes a set of "filmstrip" images of a 3D model that anticipate manipulation of the model by a user. The images are pre-cached at a client so that they can be displayed immediately as the user manipulates the model. The client then selects the appropriate pre-computed image from the pre-fetched filmstrip to display to the user, rather than making a request to the server. Model manipulations are constrained so that there is not a large or unbounded set of images to pre-compute. When the user invokes an orbit command, a wire frame cube is displayed over the model image in the client's user interface and updated immediately even though the associated effect on the model has not been computed. This gives the user an indication as to how the model will be reoriented as a result of the mouse interaction. For example, when a user drags the mouse, the cube rotates so that the user understands how much rotation will be applied to the model. Once a user orbits along a particular axis, only a subset of the filmstrip set needs to be updated to prepare for subsequent orbits.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
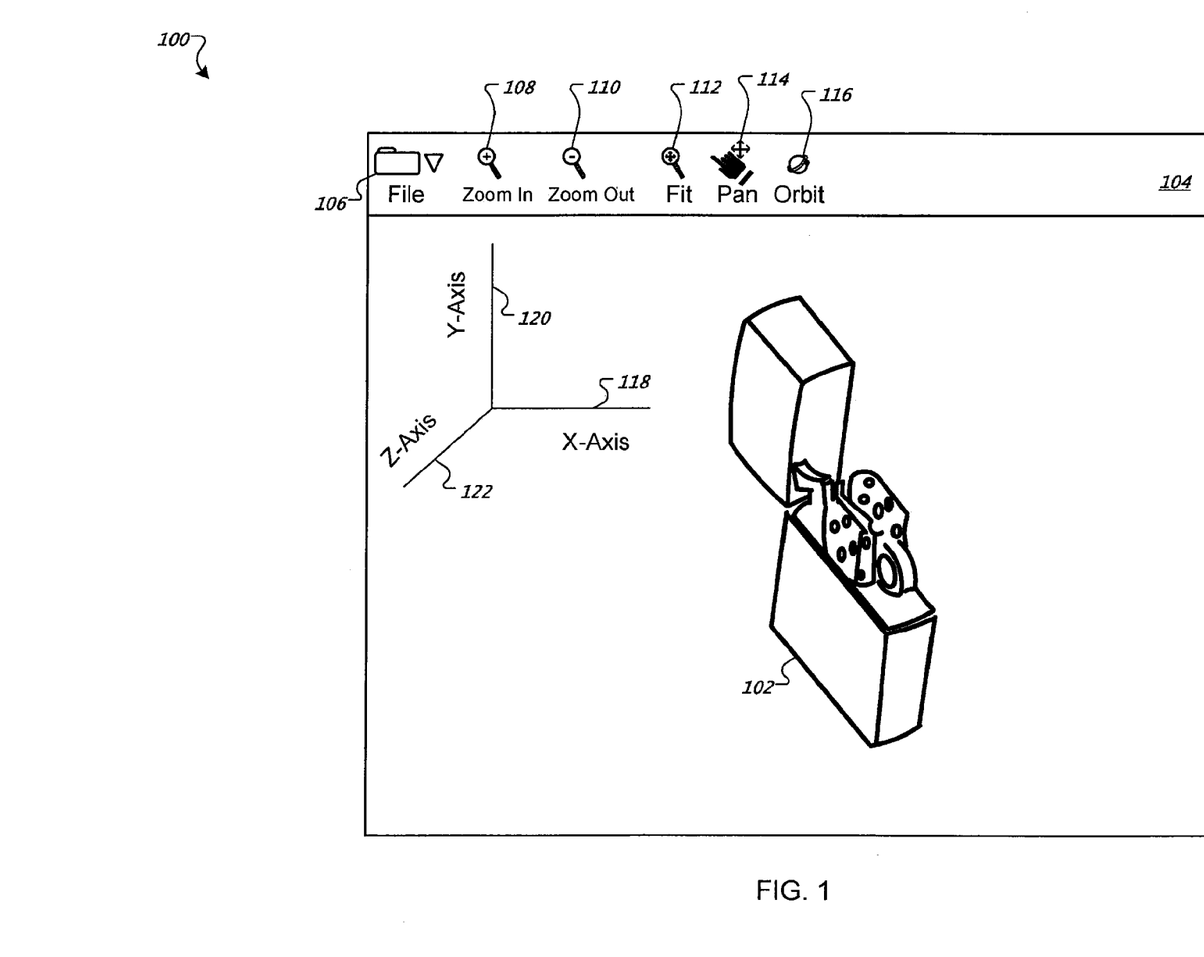
FIG. 1 illustrates an example user interface for presenting a three-dimensional drawing.

FIG. 1 illustrates a user interface 100 for presenting a 3D drawing 102 created by a CAD program or other program.

Users can interact with the drawing 102 and the user interface 100 using an input device, such as a mouse, a trackball, a microphone (e.g., voice commands), a keyboard, a camera (e.g., gestures), other suitable device, or combinations of these. The user interface 100 includes a toolbar 104, which includes buttons 106-116. The buttons 106-116 can be selected by the user to manipulate and/or interact with the drawing 102. A "file" button 106 can be used to open or load a drawing (e.g., the drawing 102 can be loaded from a file, or can be received from a network resource, such as from an Internet web server). The user interface 100 can be displayed, for example, on a client computer connected to a network. The user interface 100 can include other user controls, such as drop-down menus, for example. In various implementations, the user interface 100 is presented in a web browser. However, the user interface 100 can be presented by other software applications.

The user can perform operations to change the appearance of the drawing 102. For example, the user can use "zoom" buttons 108-110 to scale the drawing 102 larger or smaller. The user can also select a "fit" button 112 to scale the drawing 102 to fit inside the user interface 100. As another example, the user can select a "pan" button 114 to translate the drawing 102 to a new location within the user interface 100. As a fourth example, the user can select an "orbit" button 116 to orbit (i.e., rotate) the drawing 102 about an axis, resulting in the drawing 102 being displayed in a different orientation.

Zoom, pan, and orbit operations can be constrained, to limit the number of possible changes to the drawing 102's appearance given a user input. For example, the zoom operation can be constrained to allow a user to zoom in or zoom out by a fixed factor (e.g., zoom operations can be limited to zooming in or out by factors of 10%). The pan operation can be constrained to allow a user to move the drawing 102 in increments of a predetermined amount (e.g., in increments of 100 pixels) from its current location. Likewise, orbit operations can be constrained to be in increments of a fixed number of degrees (e.g., 10 degrees), about a single axis of rotation. For example, rotation operations can be constrained to rotate about one of three axes of reference in three-dimensional space (e.g., a horizontal X axis 118, a vertical Y axis 120, and a Z axis 122 which is perpendicular to the user interface 100). Pan operations can also be constrained so that the drawing 102 can be translated only along one of the X, Y, and Z axes 118-122. Other constraints are possible.

Figure 2:
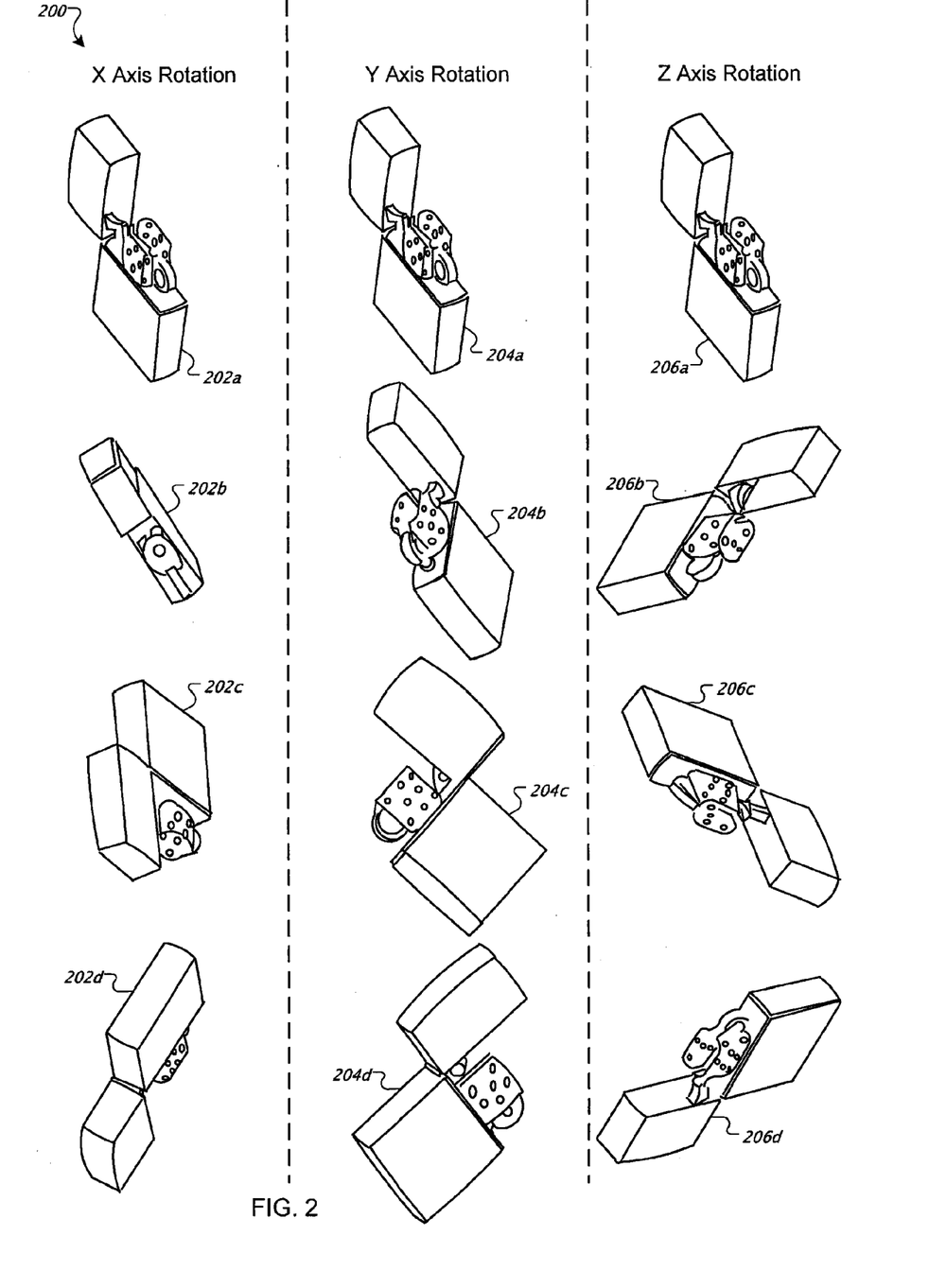
FIG. 2 illustrates examples of rotation in 3D space.

FIG. 2 illustrates examples of rotation in three-dimensional space. As discussed above, a user can, using constrained orbit operations, rotate a drawing about one of the X, Y, and Z axes 118-122. As discussed above, rotations can also be constrained to be by a certain number of degrees. In some implementations, rotation about the X axis 118 can be performed by selecting a drawing object and dragging with the mouse in a vertical fashion (i.e., up and/or down). The selected drawing object can then rotate about the horizontal X axis 118 in response to the vertical dragging. For example, drawing objects 202a-d illustrate the progression of a rotation of the drawing 102 about the X axis 118, such as in response to a downward dragging of the mouse.

In some implementations, a rotation about the Y axis 120 can be performed by selecting a drawing object and dragging with the mouse in a horizontal fashion (i.e., left and/or right). The selected drawing object can then rotate about the vertical Y axis in response to the horizontal dragging. For example, drawing objects 204a-d illustrate the progression of a rotation of the drawing 102 about the Y axis 120, such as in response to a leftward dragging of the mouse.

In some implementations, a selected drawing object can be rotated about the Z axis 122 by dragging with a mouse in an area that is outside of the selected drawing object. For example, in some implementations, a circle is drawn around the selected drawing object, and dragging along or outside of the circle can result in the rotation of the drawing object about the Z axis 122. For example, the drawing objects 206a-d illustrate the progression of a rotation of the drawing 102 about the Z axis 122.

If rotation operations (or pan or zoom operations) performed on the drawing 102 are constrained, a server computer (e.g., a server that sends image data to render in the user interface 100), can pre-compute a set of images, where the pre-computed images represent the possible outcomes of a next operation on the drawing 102. That is, the pre-computed images represent the drawing 102 after operations have been performed. The server can generate a set of pre-computed images by applying all allowable constrained operations on a selected drawing object. For example, in one implementation, a set of pre-computed images includes 106 images, including 36 images for all possible rotations (using 10 degree increments) of a drawing about the X axis 118, 35 images for all possible rotations about the Y axis 120, and 35 images for all possible rotations about the Z axis 122 (for the rotations about the Y and Z axes 120-122, the starting image is the same as for the rotation about the X axis 118, so 35 images are included for each of the Y and Z axes 120-122, rather than 36). The images 202a-d, 204a-d, and 206a-d illustrate a sampling of the images that could be included in a set of images pre-computed for the drawing 102.

The set of pre-computed images can be sent to a client that is displaying the user interface 100. For example, a user can select the file button 104 and request to load the drawing 102 from a server computer (e.g., by entering a resource name which identifies the drawing 102 as being stored on a server computer). The server computer can send the drawing 102 and can also send a set of pre-computed images corresponding to the drawing 102. The set of pre-computed images can be combined (e.g., into a single image) before sending. A combined image can be thought of as like a "filmstrip", where a single filmstrip includes multiple images.

In response to a user rotating the drawing 102, the client can determine the axis about which the drawing 102 was rotated, and the number of degrees that the drawing 102 was rotated. The client can select and display the pre-computed image that most closely resembles the effect of the rotation operation. For example, if the user rotates the drawing 102 forty degrees clockwise about the Y axis 120, the client can determine which pre-computed image most closely represents the drawing 102 after such a rotation. The drawing 102 can be replaced with the selected pre-computed image.

If the pre-computed images are combined when sent from the server (e.g., in a filmstrip), the identified pre-computed image can be cropped from the set of images and then displayed in the user interface 100. The client can crop identified images after each operation, or the client can extract individual images from the combined image after receipt of the combined image (e.g., after receipt of the combined image (and possibly before operations are performed) the client can extract individual images, and for example, store the individual images in client memory, and then, after an operation, display an identified individual image).

The server can generate pre-computed images by applying operations that are equally separated from one another (e.g., rotations about an axis that are all ten degrees apart from one another), or the server can cluster more pre-computed images closer to the current position of the drawing 102. For example, the server can apply rotation operations that are five degrees apart (e.g., 5, 10, 15, 20, 25, 30) for the first thirty degrees of rotation from the current position of the drawing 102, and then perform rotations that are further spaced apart (e.g., 10 degrees apart) for rotation values that are more than thirty degrees rotated from the current position of the drawing 102.

In some implementations, an operation amount (e.g., rotation, zoom or pan amount) performed using the user interface 100 may not coincide exactly with the operation amounts performed by the server to generate the pre-computed images. For example, a rotation operation performed using the user interface 100 may be fluid and may accept a rotation value of a high degree of precision, such as a client user rotating the drawing 102 by 8.2 degrees. The server may have generated pre-computed images that are ten degrees apart. The client can identify a pre-computed image that most closely represents the performed operation. For example, the client can identify the pre-computed image corresponding to a 10 degree rotation. The client can "round" (e.g., round up) to find the nearest pre-computed image. In cases where two pre-computed images most closely representing the client operation are equally different from the client operation, the client can choose to select either the upper or lower operation value. For example, the user may rotate the drawing 102 by 15 degrees, the server may have generated pre-computed images rotated by 10 and 20 degrees, and the client can choose either the 10 or 20 degree rotation. In some implementations, the user interface 100 restricts client operations to operation amounts that coincide exactly with operation amounts used by the server to pre-compute images.

After a pre-computed image is displayed, the server can generate and send a new set of pre-computed images to prepare for subsequent operations. The server can determine which images need to be generated, and can generate and send only those images that are needed. For example, some of the needed pre-computed images may be included in the previously-sent filmstrip. By way of illustration, if a user rotates a drawing about the X axis 118, the server may need to regenerate and send images corresponding to a subsequent rotation about the Y or Z axes 120-122, but the current images corresponding to the rotation about the X axis 118 may not need to be regenerated.

Figure 3A:
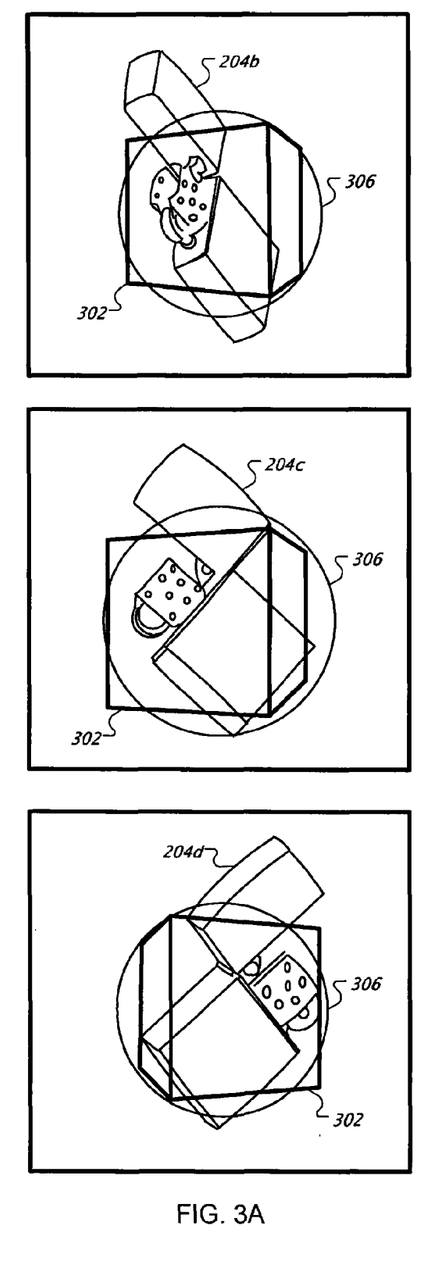
FIGS. 3A-B illustrate animated rotation indicators.
Figure 3B:
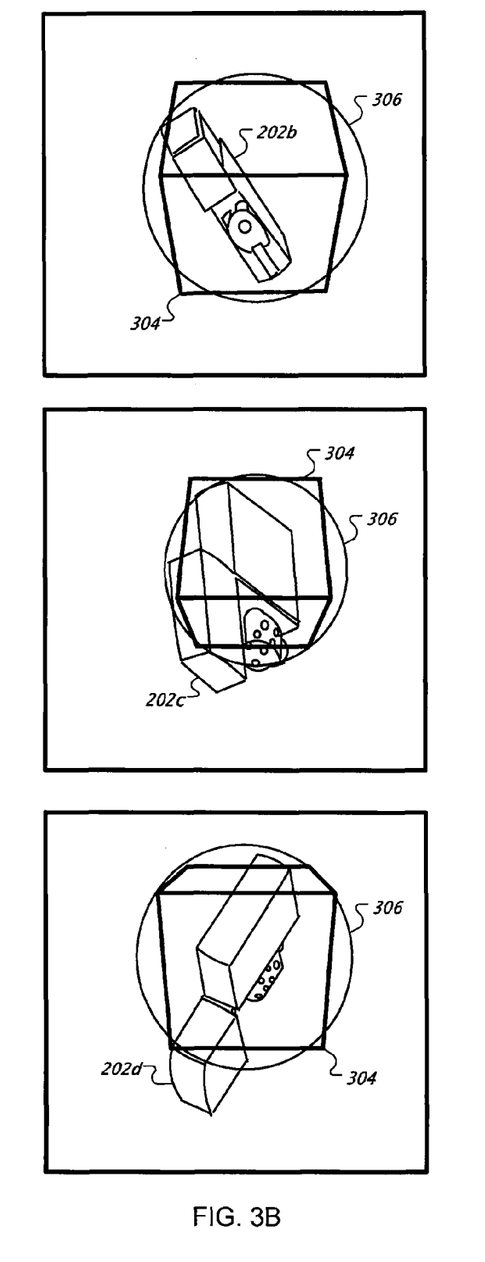

FIGS. 3A-3B illustrate animated rotation indicators. The drawing objects 204b-d illustrate a rotation of the drawing object 102 about the Y axis 120. A cube 302 can be displayed as a user rotates the drawing object 102, to provide a visual indication of how the drawing will be oriented based on the rotation. For example, as a user begins to drag the mouse (e.g., the user can drag leftward to rotate the drawing object 102 about the Y axis 120), the cube 302 can appear. As the user continues to drag with the mouse, the cube 302 can rotate in a direction that corresponds to the dragging. For example, if the user drags the drawing object 204b to the left, the cube 302 can rotate to the left, in an amount indicative of how much the user has dragged. When the user releases the mouse, the cube 302 can disappear, and a pre-computed image can be displayed, where the pre-computed image is closest to the drawing 102 rotated in the amount that the cube was rotated.

As another example, the drawing objects 202b-d illustrate a rotation of the drawing object 102 about the X axis 118. A cube 304 can provide a visual indication of how the drawing will appear based on the downward rotation. For example, as the user drags downward, the cube 304 can rotate downward, in an amount representing the amount the user has dragged. An indicator other than a cube can be used, such as another shape, or an indicator which displays a numerical value indicating the amount of rotation that will be applied. Although an animated indicator for rotation is illustrated, other animated indicators are possible, and for other operations such as for scaling or translation.

In some implementations, a circle 306 can also appear while the user is performing a rotation. For example, the circle 306 can appear after the user selects the orbit button 116. The circle 306 can be used to allow the user to rotate about the Z axis 122. For example, if a user selects the circle 306, or presses and holds the mouse outside of the circle 306, and then drags, for example in a clockwise or counter-clockwise motion, the selected drawing object (e.g., 202b) can rotate about the Z axis 122.

Figure 4:
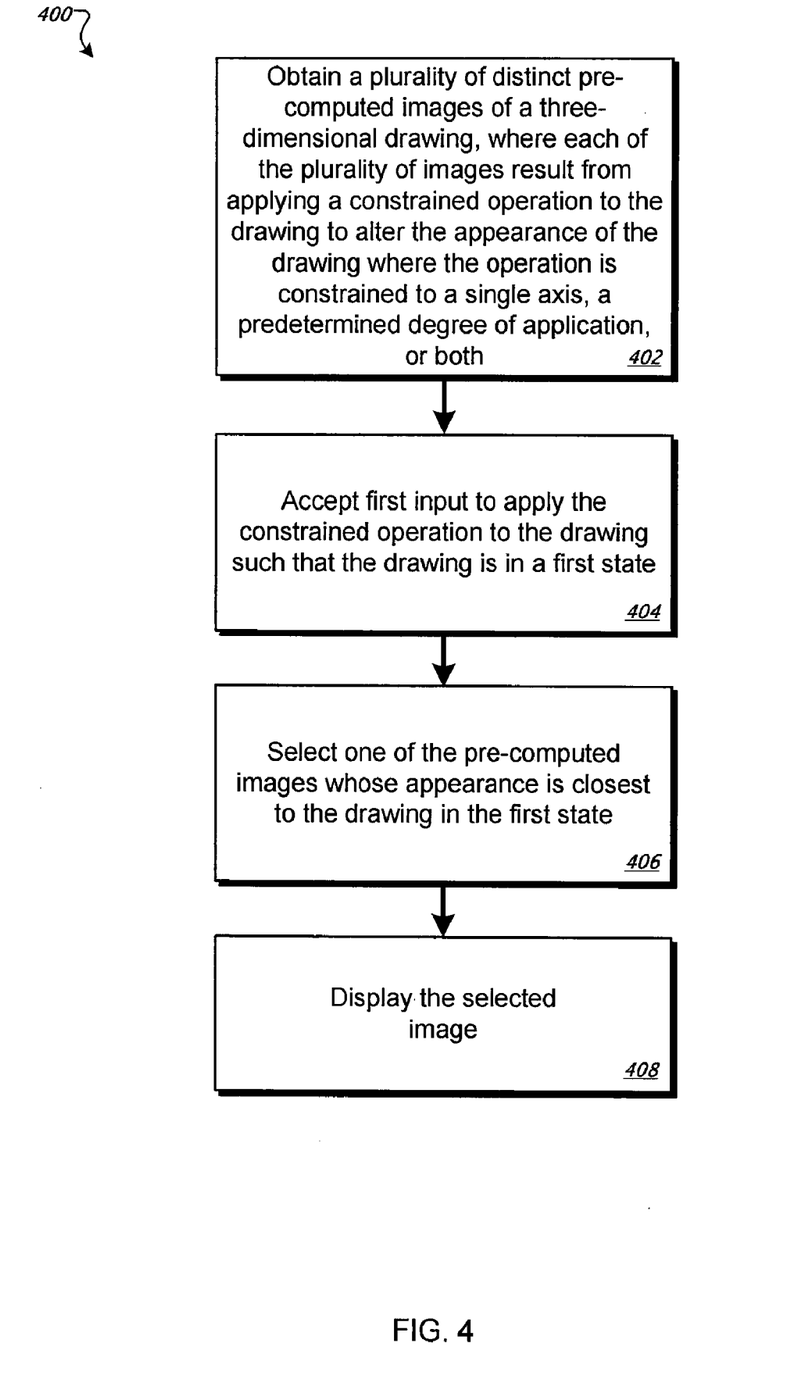
FIG. 4 is a flowchart of an example method for updating a drawing.

FIG. 4 is a flowchart of an example method 400 for updating a drawing. A plurality of distinct pre-computed images of a three-dimensional drawing is obtained, where each of the plurality of images result from applying a constrained operation to the drawing to alter the appearance of the drawing where the operation is constrained to a single axis, a predetermined degree of application, or both (step 402). For example, a server computer can generate pre-computed images by applying a zoom operation to the drawing 102, where each zoom operation changes the size of the drawing 102 by a different factor (e.g., zoom operations can reduce the drawing 102 by 5%, 10%, 15%, etc, and can enlarge the drawing 102 by 5%, 10%, 15%, etc.). The server computer can send the pre-computed images to a client computer that is displaying the user interface 100.

Next, a first input to apply the constrained operation to the drawing such that the drawing is in a first state is accepted (step 404). For example, a user can select the drawing 102 in the user interface 100 and then select the zoom in button 108. The user interface 100 can determine a zoom factor to apply (e.g., 10%) in response to the selection of the zoom in button 108. One of the pre-computed images whose appearance is closest to the drawing in the first state is then selected (step 406). For example, a pre-computed image that most closely matches the drawing 102 enlarged by the determined factor (e.g., 10%) can be selected from the pre-computed images received from the server. The selected image is then displayed (step 408). For example, the drawing 102 can be removed from the user interface 100, and the identified pre-computed image can be displayed in the user interface 100.

Figure 5:
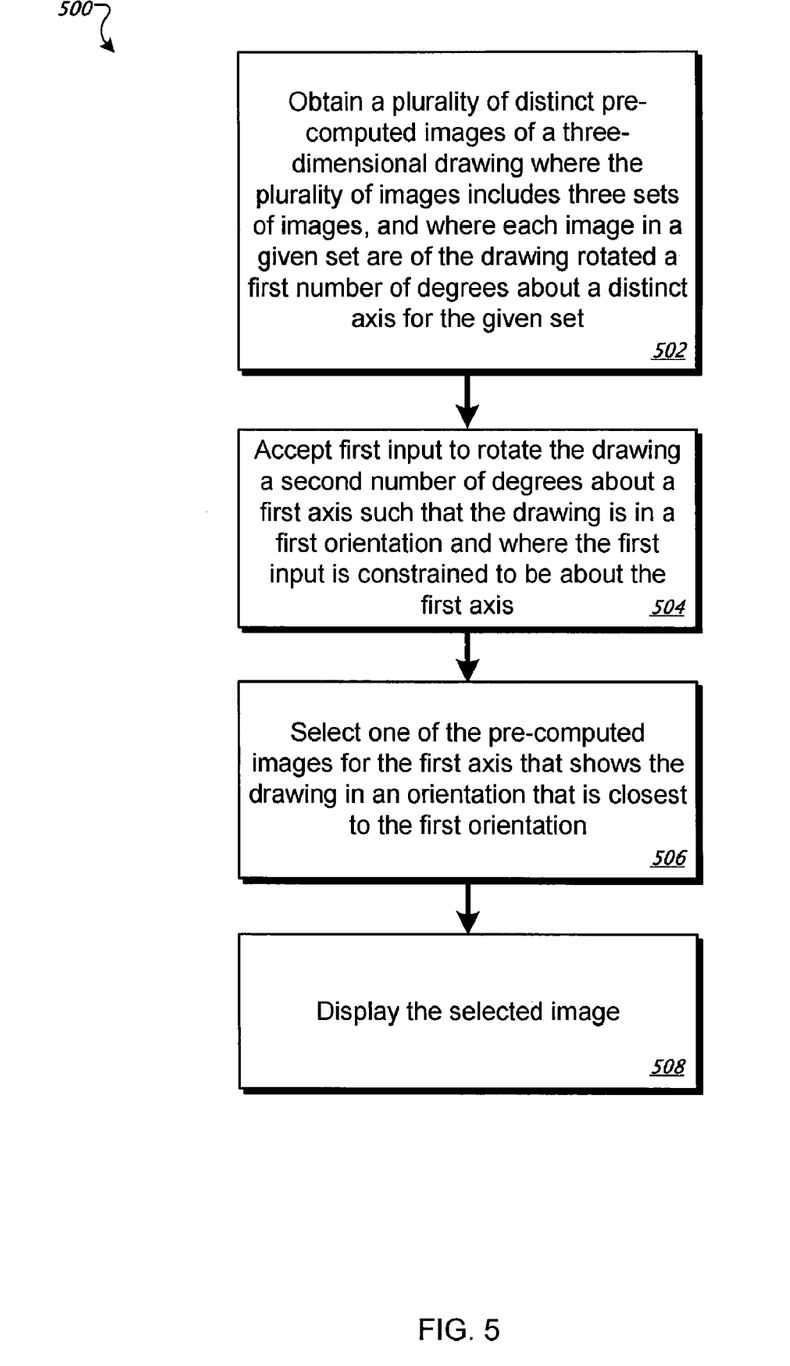
FIG. 5 is a flowchart of an example method for updating a drawing in response to a rotation operation.

FIG. 5 is a flowchart of an example method 500 for updating a drawing in response to a rotation operation. First, a plurality of distinct pre-computed images of a three-dimensional drawing is obtained, where the plurality of images includes three sets of images, and where each image in a given set are of the drawing rotated a first number of degrees about a distinct axis for the given set (step 502). For example, a server computer can generate a set of pre-computed images by applying rotation operations to the drawing 102, rotating the drawing 102 about each of the X, Y and Z axes 118-122, where each rotation is 10 degrees offset from the previous rotation. The set of generated pre-computed images can include 36 distinct images generated from rotations about the X axis 118, 35 images generated from rotations about the Y axis 120, and 35 images generated from rotations about the Z axis 122. The generated images can be sent from the server computer to a client computer displaying the user interface 100.

A first input is then accepted to rotate the drawing a second number of degrees about a first axis is accepted, such that the drawing is in a first orientation and where the first input is constrained to be about the first axis (step 504). For example, a user viewing the user interface 100 can select the drawing 102, and then select the orbit button 116, and then drag with the mouse to indicate a rotation operation about a particular axis (such as dragging left to indicate a rotation operation about the Y axis 122, or dragging down to indicate a rotation about the X axis 118). The user interface 100 can determine the amount of rotation represented by the drag operation.

One of the pre-computed images for the first axis that shows the drawing in an orientation that is closest to the first orientation is then accepted (step 506). For example, a pre-computed image that most closely matches the drawing 102 rotated by the determined amount (e.g., 50 degrees) can be selected from the pre-computed images received from the server. The selected image is then displayed (step 508). For example, the drawing 102 can be removed from the user interface 100, and the identified pre-computed image can be displayed in the user interface 100.

Figure 6:
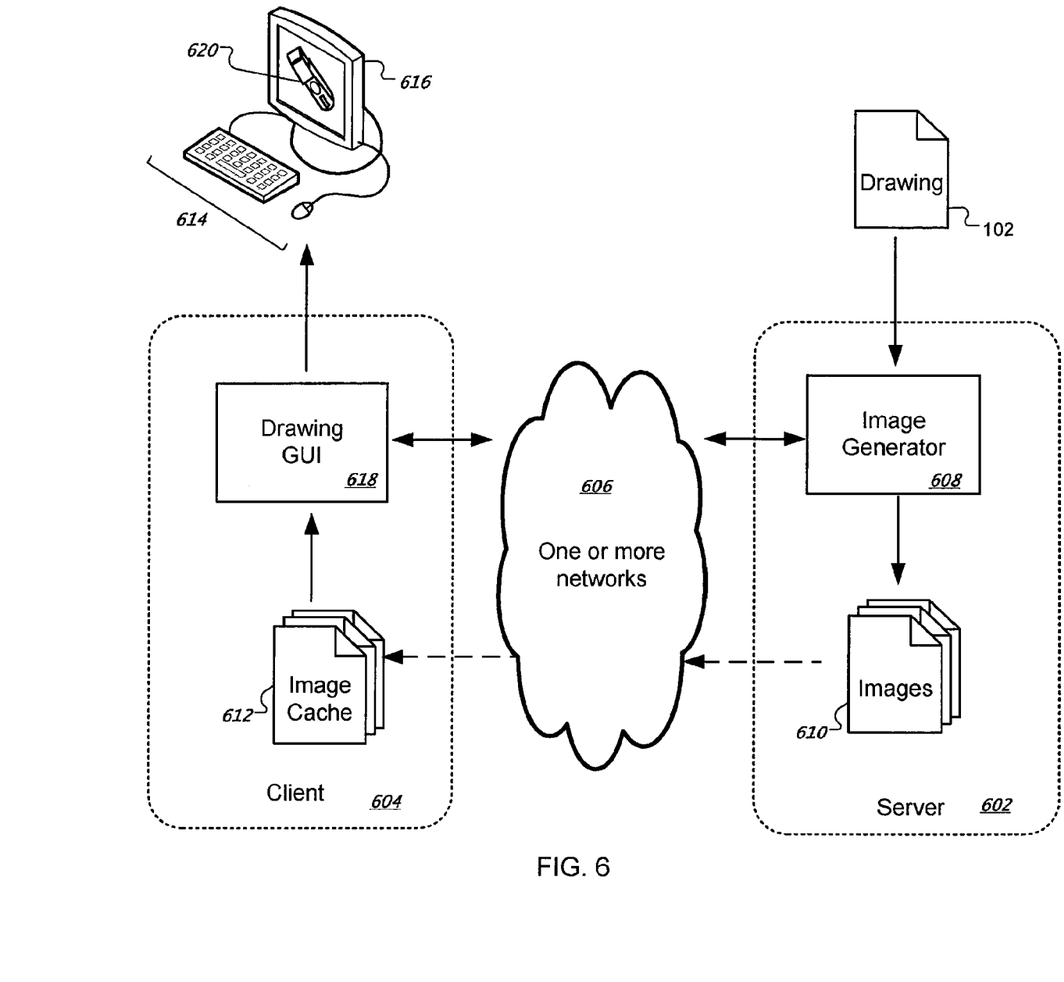
FIG. 6 illustrates an example system for generating pre-computed images.

FIG. 6 illustrates an example system 600 for generating pre-computed images. A server computing device 602 can communicate with a client computing device 604 across one or more networks 606. The one or more networks 606 can include a local area network (LAN), a wide area network (WAN), the Internet, or combinations of these. The server 602 includes an image generator 608 and a set of pre-computed images 610. The image generator 608 can, given a drawing (e.g., drawing 102), generate the set of pre-computed images 610 by applying an operation (e.g., zoom, pan, rotation) to the drawing. (In some implementations, if the image generator 608 has previously pre-computed images for another client, the previously pre-computed images can be used instead of regenerating them.) For example, the server 602 can generate the pre-computed images 610 by applying a zoom operation to the drawing 102, where each zoom operation changes the size of the drawing 102 by a different factor (e.g., zoom operations can reduce the drawing 102 by 5%, 10%, 15%, etc, and can enlarge the drawing 102 by 5%, 10%, 15%, etc.). As another example, the server 602 can generate the pre-computed images 610 by applying rotation operations about the X, Y, and Z axes 118-122. The set of pre-computed images 610 can be sent to the client 604 across the network 608. The client 604 can store the received image data in an image cache 612.

The client 604 includes input/output devices, such as a keyboard and mouse 614 and a display device 616. The client includes a drawing graphical user interface (GUI) component 618. The drawing GUI component 618 can render images on the display 616, such as rendering a drawing 620 in an interface 100 on the display 616. For example, in response to a user performing an operation (e.g., pan, zoom, rotation) on the drawing 620, the drawing GUI component 618 can identify the degree of application of the operation (e.g., amount of zoom or pan, or amount and axis of rotation), and can identify an image in the image cache 612 which most closely matches the effect of the operation, and can display the identified image in the display 616.

Figure 7:
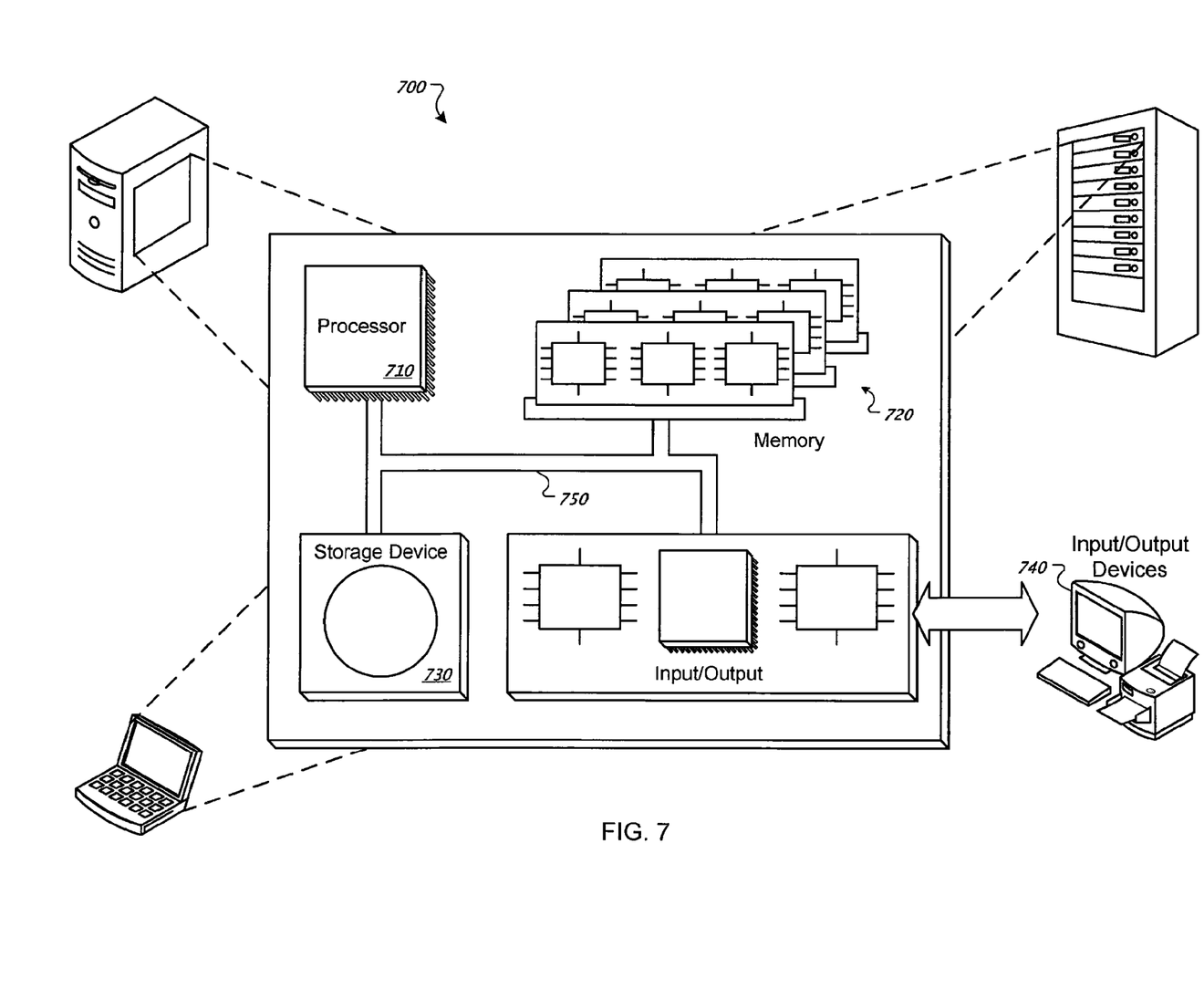
FIG. 7 is a schematic diagram of a generic computer system.

FIG. 7 is a schematic diagram of a generic computer system 700. The system 700 can be used for practicing operations described in association with the techniques 400 and 500. The system 700 can include a processor 710, a memory 720, a storage device 730, and input/output devices 740. Each of the components 710, 720, 730, and 740 are interconnected using a system bus 750. The processor 710 is capable of processing instructions for execution within the system 700. Such executed instructions can implement one or more components of system 600, for example. In one implementation, the processor 710 is a single-threaded or multi-threaded processor. The processor 710 is capable of processing instructions stored in the memory 720 or on the storage device 730 to display graphical information for a user interface on the input/output device 740.

The memory 720 is a computer readable medium such as volatile or non volatile random access memory that stores information within the system 700. The memory 720 could store data structures representing pre-computed images, for example. The storage device 730 is capable of providing persistent storage for the system 700. The storage device 730 may be a floppy disk device, a hard disk device, an optical disk device, or a tape device, or other suitable persistent storage means. The input/output device 740 provides input/output operations for the system 700. In one implementation, the input/output device 740 includes a keyboard and/or pointing device. In another implementation, the input/output device 740 includes a display unit for displaying graphical user interfaces.

The input/output device 740 can provide input/output operations for a CAD system. The CAD system can be, for example, AutoCad™, Autodesk Freewheel™, Autodesk Architectural Desktop™ or Autodesk Building Systems™, available from Autodesk, Inc., of San Rafael, Calif., or another CAD application or other software application. The CAD system can include computer software components that manage three-dimensional drawings. Examples of such software components include the drawing GUI component 618, which can be persisted in storage device 730, memory 720 or can be obtained over a network connection 606, to name a few examples.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A method implemented by data processing apparatus, the method comprising:
   receiving a plurality of distinct pre-computed images of a drawing of a three-dimensional object wherein each of the plurality of images results from successive application of a constrained operation of a first number of degrees to the object wherein the constrained operation is an operation that is constrained to a single axis or a predetermined scaling factor;
   obtaining user input to apply the constrained operation of a second number of degrees to the object, wherein the second number of degrees is not a multiple of the first number of degrees;
   selecting one of the pre-computed images that most closely resembles the object as modified by the constrained operation of the second number of degrees, wherein selecting is based on a comparison of the first number of degrees with the second number of degrees;
   causing display of the selected image; and
   wherein receiving, obtaining and selecting are performed by the data processing apparatus.

2. The method of claim 1 wherein the constrained operation is one of: rotation, scaling, or translation.

3. The method of claim 1, further comprising:
during obtaining of the input, displaying an animation that changes in response to the input and provides a visual indication of how the object will appear.

4. The method of claim 3 where the animation is of a cube.

5. The method of claim 1 where selecting one of the pre-computed images and causing display of the pre-computed image occurs during the obtaining.

6. The method of claim 1, further comprising:
obtaining an additional plurality of pre-computed images of the object wherein the additional plurality of images result from applying the constrained operation to the object.

7. The method of claim 6 wherein the additional plurality of pre-computed images do not include any of the plurality of pre-computed images.

8. The method of claim 1 where the plurality of pre-computed images are obtained from a file.

9. The method of claim 1 where the selected image is displayed in a web browser.

10. A tangible computer program product, encoded on a machine-readable storage device, operable to cause data processing apparatus to perform operations comprising:
receiving a plurality of distinct pre-computed images of a drawing of a three-dimensional object wherein each of the plurality of images results from successive application of a constrained operation of a first number of degrees to the object wherein the constrained operation is an operation that is constrained to a single axis or a predetermined scaling factor;
obtaining user input to apply the constrained operation of a second number of degrees to the object, wherein the second number of degrees is not a multiple of the first number of degrees;
selecting one of the pre-computed images that most closely resembles the object as modified by the constrained operation of the second number of degrees, wherein selecting is based on a difference comparison of the first number of degrees with the second number of degrees based on a comparison of the first number of degrees with the second number of degrees; and
causing display of the selected image.

11. A system comprising:
a computer readable storage device storing instructions; and
data processing apparatus operable to execute the instructions to perform operations comprising:
receiving a plurality of distinct pre-computed images of a drawing of a three-dimensional object wherein each of the plurality of images results from successive application of a constrained operation of a first number of degrees to the object wherein the constrained operation is an operation that is constrained to a single axis or a predetermined scaling factor;
obtaining user input to apply the constrained operation of a second number of degrees to the object, wherein the second number of degrees is not a multiple of the first number of degrees;
selecting one of the pre-computed images that most closely resembles the object as modified by the constrained operation of the second number of degrees, wherein selecting is based on a difference comparison of the first number of degrees with the second; and
causing display of the selected image.

12. The system of claim 11 wherein the constrained operation is one of: rotation, scaling, or translation.

13. The system of claim 11 wherein the operations further comprise:
during obtaining of the input, displaying an animation that changes in response to the input and provides a visual indication of how the object will appear.

14. The system of claim 13 wherein the animation is of a cube.

15. The system of claim 11 wherein selecting one of the pre-computed images and causing display of the pre-computed image occurs during the obtaining.

16. The system of claim 11, wherein the operations further comprise:
obtaining an additional plurality of pre-computed images of the object wherein the additional plurality of images result from applying the constrained operation to the object.

17. The system of claim 16 wherein the additional plurality of pre-computed images does not include any of the plurality of pre-computed images.

18. The system of claim 11 wherein the plurality of pre-computed images are obtained from a file.

19. The system of claim 11 wherein the selected image is displayed in a web browser.

20. The tangible program product of claim 10 wherein the constrained operation is one of: rotation, scaling, or translation.

21. The tangible program product of claim 10, further comprising:
during obtaining of the input, displaying an animation that changes in response to the input and provides a visual indication of how the object will appear.

22. The tangible program product of claim 21 where the animation is of a cube.

23. The tangible program product of claim 10 where selecting one of the pre-computed images and causing display of the pre-computed image occurs during the obtaining.

24. The tangible program product of claim 10, further comprising:
obtaining an additional plurality of pre-computed images of the object wherein the additional plurality of images result from applying the constrained operation to the object.

25. The tangible program product of claim 24 wherein the additional plurality of pre-computed images do not include any of the plurality of pre-computed images.

26. The tangible program product of claim 10 where the plurality of pre-computed images are obtained from a file.

27. The tangible program product of claim 10 where the selected image is displayed in a web browser.

* * * * *

UNITED STATES PATENT AND TRADEMARK OFFICE
CERTIFICATE OF CORRECTION

PATENT NO. : 8,232,988 B2  
APPLICATION NO. : 11/931919  
DATED : July 31, 2012  
INVENTOR(S) : Brian Philip Mathews et al.

Page 1 of 1

It is certified that error appears in the above-identified patent and that said Letters Patent is hereby corrected as shown below:

On the Title Page, Item (56) (Other Publications), line 10, delete "PCT/US200/058162" and insert -- PCT/US2008/058162 --, therefor.

On Col. 12, line 5 (Claim 11), delete "second" and insert -- second number of degrees; --, therefor.

Signed and Sealed this  
Second Day of October, 2012

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 8,232,988 B2 | Page 1 of 1 |
| APPLICATION NO. | : 11/931919 | |
| DATED | : July 31, 2012 | |
| INVENTOR(S) | : Mathews et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 820 days.

Signed and Sealed this
Twenty-seventh Day of November, 2012

David J. Kappos
*Director of the United States Patent and Trademark Office*